(12) United States Patent
Na

(10) Patent No.: US 11,131,875 B2
(45) Date of Patent: Sep. 28, 2021

(54) DISPLAY DEVICE

(71) Applicant: SAMSUNG ELECTRONICS CO., LTD., Suwon-si (KR)

(72) Inventor: Jeongshan Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/268,033

(22) PCT Filed: Jun. 12, 2019

(86) PCT No.: PCT/KR2019/007047
§ 371 (c)(1),
(2) Date: Feb. 11, 2021

(87) PCT Pub. No.: WO2020/085603
PCT Pub. Date: Apr. 30, 2020

(65) Prior Publication Data
US 2021/0165269 A1 Jun. 3, 2021

(30) Foreign Application Priority Data
Oct. 24, 2018 (KR) .......................... 10-2018-0127784

(51) Int. Cl.
*G02F 1/1335* (2006.01)

(52) U.S. Cl.
CPC .. *G02F 1/133514* (2013.01); *G02F 1/133504* (2013.01); *G02F 1/133512* (2013.01)

(58) Field of Classification Search
CPC ................................................. G02F 1/133514
See application file for complete search history.

(56) References Cited

U.S. PATENT DOCUMENTS

| | | | |
|---|---|---|---|
| 9,939,678 B2 | 4/2018 | Qiu et al. | |
| 2016/0170264 A1 | 6/2016 | Qin | |

(Continued)

FOREIGN PATENT DOCUMENTS

| | | |
|---|---|---|
| JP | 8-234183 A | 9/1996 |
| JP | 2010-54995 A | 3/2010 |

(Continued)

OTHER PUBLICATIONS

International Search Report (PCT/ISA/210) dated Sep. 18, 2019 by the International Searching Authority in International Patent Application No. PCT/KR2019/007047.

(Continued)

*Primary Examiner* — Edmond C Lau
(74) *Attorney, Agent, or Firm* — Sughrue Mion, PLLC

(57) ABSTRACT

A display device according to the present disclosure comprises: a display panel comprising a color filter layer consisting of a plurality of color filters arranged in a matrix form and black matrices disposed between the plurality of color filters; a backlight configured to supply light to the display panel; and a light-collecting layer disposed on the display panel, wherein the light-collecting layer comprises a tunnel member having a plurality of vertical spaces respectively corresponding to the plurality of color filters, and a prism-layer in which first prisms having a first direction and second prisms having a second direction intersecting the first direction are alternately arranged, and disposed on the tunnel member.

14 Claims, 6 Drawing Sheets

(56) References Cited

U.S. PATENT DOCUMENTS

2017/0031205 A1* 2/2017 Lee .................. G02F 1/133555
2018/0196265 A1 7/2018 Bouchier et al.
2018/0284534 A1 10/2018 Song et al.

FOREIGN PATENT DOCUMENTS

| JP | 4946678 B2 | 6/2012 |
| JP | 5267098 B2 | 8/2013 |
| JP | 5796929 B2 | 10/2015 |
| KR | 10-2003-0091901 A | 12/2003 |
| KR | 10-2009-0043958 A | 5/2009 |
| KR | 10-2010-0050632 A | 5/2010 |

OTHER PUBLICATIONS

Written Opinion (PCT/ISA/237) dated Sep. 18, 2019 by the International Searching Authority in International Patent Application No. PCT/KR2019/007047.

* cited by examiner

DISPLAY DEVICE

TECHNICAL FIELD

The disclosure relates to a display device, and more particularly, to a display device including a display panel wherein the viewing angle and visibility of the side surface have been improved.

DESCRIPTION OF THE RELATED ART

A display device displays an image with elements emitting light. A display device is classified into a liquid crystal display (LCD), an organic light emitting diode (OLED) display, a plasma display panel (PDP), and an electrophoretic display, etc. according to a method of emitting light.

A liquid crystal display (LCD) is one of display devices that are currently used most widely, and it consists of two sheets of substrates wherein electrodes are formed and a liquid crystal layer inserted between them. A liquid crystal display is a display device that adjusts the amount of transmitted light by rearranging liquid crystal particles of a liquid crystal layer by applying voltages to two electrodes.

A liquid crystal display has a problem that visibility of the side surface is inferior compared to visibility of the front surface.

DETAILED DESCRIPTION OF THE INVENTION

Technical Problem

The disclosure was devised for overcoming the aforementioned problem, and is aimed at providing a display device of which viewing angle and visibility can be improved.

Technical Solution

A display device according to an aspect of the disclosure includes a display panel comprising a color filter layer consisting of a plurality of color filters arranged in a matrix form and black matrices disposed between the plurality of color filters, a backlight configured to supply light to the display panel, and a light-collecting layer disposed in the upper part of the display panel, wherein the light-collecting layer includes a tunnel member having a plurality of vertical spaces respectively corresponding to the plurality of color filters, and a prism-layer in which a first prism having a first direction and a second prism having a second direction intersecting the first direction are alternately arranged, and disposed in the upper part of the tunnel member.

Also, each of the first prism and the second prism may be disposed in the upper part of one corresponding vertical space among the plurality of vertical spaces.

Each of the first prism and the second prism may be extensively formed in a stripe shape, and the second prism may be orthogonal to the first prism.

The first prism may be a horizontal prism, and the second prism may be a vertical prism.

The first prism may be disposed to be in parallel with the side surface of the base substrate, and the second prism may be disposed vertically to the side surface of the base substrate.

The first prism may be disposed to be tilted by a specific angle with respect to the side surface of the base substrate.

The vertical spaces may be formed to correspond to one color filter among the plurality of color filters.

The tunnel member may further include a plurality of partitions that are extensively formed between adjacent color filters among the plurality of color filters.

The plurality of partitions may form the vertical spaces by partitioning the tunnel member.

The plurality of partitions may be disposed to be tilted by a specific angle with respect to the prism layer.

The plurality of partitions may include a first partition tilted toward one side of the tunnel member, and a second partition tilted toward the other side of the tunnel member, and the first partition and the second partition may be alternately arranged.

The plurality of partitions may consist of black light shielding film.

The plurality of partitions may include a coating layer.

The display panel may further include a base substrate and a liquid crystal layer disposed in the upper part of the base substrate, and the color filter layer may be disposed in the upper part of the liquid crystal layer.

MODE FOR IMPLEMENTING THE INVENTION

Hereinafter, embodiments of an LED and a method of manufacturing an LED according to the disclosure will be described in detail with reference to the accompanying drawings.

The embodiments that will be described below are exemplary embodiments for promoting understanding of the disclosure, and it should be understood that the disclosure may be implemented while being modified in various forms, unlike the embodiments described herein. Meanwhile, in explaining the disclosure below, in case it is determined that detailed explanation of related known functions or components may unnecessarily confuse the gist of the disclosure, the detailed explanation and detailed illustration thereof will be omitted. Also, in the accompanying drawings, some components may not be illustrated in their actual scales, but may be illustrated in more enlarged sizes than their actual sizes, for promoting understanding of the disclosure.

Terms such as "first," "second," and the like may be used to describe various components, but the components are not intended to be limited by the terms. The terms are used only for the purpose of distinguishing one component from another component. For example, a first component may be called a second component, and a second component may be called a first component in a similar manner, without departing from the scope of protection of the disclosure.

The terms used in the embodiments of the disclosure may be interpreted as meanings that are generally known to those of ordinary skill in the art to which the disclosure belongs, unless defined differently in the disclosure.

Also, the terms 'up,' 'down,' 'front end,' 'rear end,' 'upper part,' 'lower part,' 'upper end,' 'lower end,' etc. used in the disclosure are defined based on the drawings, and the form and the location of each component are not to be limited by the terms.

Hereinafter, the disclosure will be described in detail with reference to the accompanying drawings.

Figure 1:
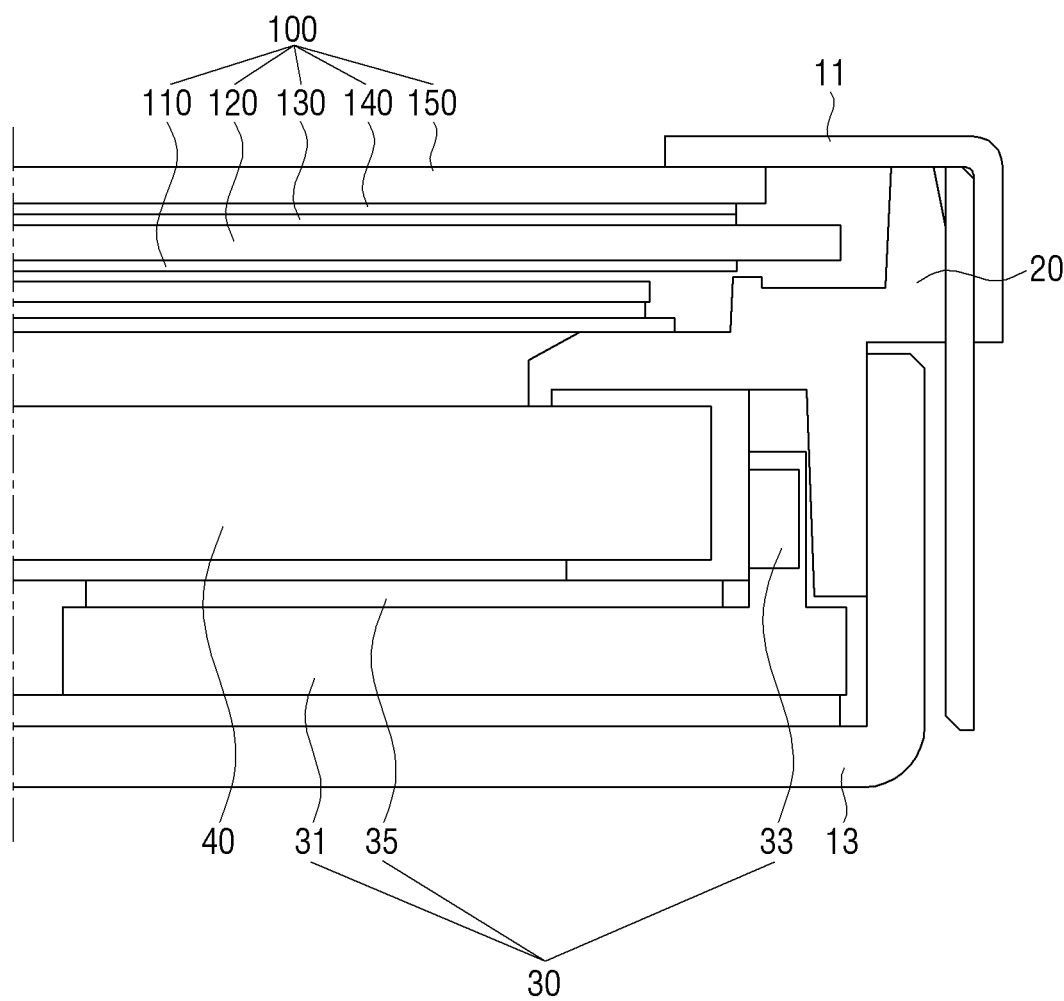
FIG. 1 is a schematic cross-sectional diagram illustrating a display device according to an embodiment of the disclosure.

FIG. 1 is a schematic cross-sectional diagram illustrating a display device according to an embodiment of the disclosure.

Referring to FIG. 1, a display device 10 according to an embodiment of the disclosure includes a display panel 100 displaying light as an image, and a backlight 30 including a light source 33 providing light to the display panel.

Specifically, the display device 10 may include a display panel 100, a backlight 30 separately arranged in the lower part of the display panel 100, a mold member 20 that supports the display panel 100 and the backlight 30 to be separated from each other, and a top chassis 11 and a bottom chassis 13 that are respectively arranged in the upper parts and the lower parts of the display panel 100 and the backlight 30.

The display panel 100 is arranged on the upper side of the backlight 30 so as to oppose the backlight 30 that will be described below. The display panel 100 may include a base substrate 110, a color filter layer 130 opposing the base substrate 110, and a light-collecting layer 150 that is arranged in the upper part of the color filter 131, and collects light.

It was described that the light-collecting layer 150 is included in the display panel 100, but the disclosure is not limited thereto, and the light-collecting layer 150 may be attached to the outside of the display panel 100 as a separate independent component.

The base substrate 110 is a substrate which is formed as a matrix form of thin film transistors that are switching elements. To the source terminals and the gate terminals of the thin film transistors, data lines and gate lines are respectively connected, and to the drain terminals, pixel electrodes consisting of a transparent conductive material are connected.

The color filter layer 130 is a substrate which is arranged to oppose the base substrate 110, and wherein red, green, blue (RGB) pixels for implementing colors are formed in a form of a thin film.

On the color filter layer 130, a common electrode consisting of a transparent conductive material is formed so as to oppose the pixel electrodes formed on the base substrate 110.

In the upper part of the display panel 100, the light-collecting layer 150 may be further included. The light-collecting layer 150 may be arranged in the upper part of the color filter 131.

The light-collecting layer 150 may improve the optical characteristic of the display device 10 by making the luminance of light output from the display panel 100 uniform and collecting diffused or high luminance light. The detailed structure of the light-collecting layer 150 will be described below.

In the display panel 100, if power is applied to the gate terminals of the thin film transistors, an electric field may be formed between the pixel electrodes and the common electrode, and the arrangement of the liquid crystals of the liquid crystal layer 120 interposed between the base substrate 110 and the color filter layer 130 may be changed by the electric field, and light transmittance may be changed according to the change of the arrangement of the liquid crystals, and an image of a desired gradation may be displayed.

The display panel 100 may form an image by adjusting the arrangement of the liquid crystals of the liquid crystal layer 120, but it may not emit light by itself. Thus, the display panel 100 displays an image by being supplied with light from the backlight 30 located on the rear surface of the display panel 100.

The backlight 30 is for providing light to the display panel 100, and it includes a light source. As an example, a light source may consist of light emitting diodes (LEDs) 33. The backlight 30 may consist of a side light type or a direct type divided according to the location of the light source emitting light.

As illustrated in FIG. 1, in case the backlight 30 is a side light type, it may refract the light of the light source arranged on the side surface with respect to the display panel 100 to a light guide panel (LGP) 40, and provide the light to a liquid crystal panel. Meanwhile, the side light type backlight 30 may further include an optical sheet. The light emitted from the light source 33 is introduced into the light guide panel 40, and is then guided to be surface emitted through total reflection and diffused reflection inside the light guide panel 40, and the light that is surface emitted from the light guide panel 40 is diffused and collected by the optical sheet (not shown) arranged on the upper side of the light guide panel 40, and is then introduced into the display panel 100.

The side light type backlight 30 may include an LED driving printed circuit substrate 31, a plurality of LEDs 33 which are mounted on the LED driving printed circuit substrate 31 and which are a light source emitting light, and an optical sheet 35.

The LED driving printed circuit substrate 31 may be fixedly attached to the inner side surface of the bottom chassis 13. Along one side surface of the LED driving printed circuit substrate 31, a plurality of LEDs 33 may be arranged. The plurality of LEDs 33 may be arranged at specific intervals along each side of the light guide panel 40.

In FIG. 1, the backlight 30 is illustrated as a side light type, but the disclosure is not limited thereto, and the backlight may consist of a direct type. In case the backlight is a direct type, a plurality of light sources are arranged on the rear surface of the display panel and provide light to the display panel 100.

The mold member 20 supports some components of the liquid crystal display device 10 together with the top chassis 11 and the bottom chassis 13. For this, the mold member 20 is arranged in a corner area inside the liquid crystal display device 10, and is arranged between the top chassis 11 and the bottom chassis 13.

Figure 2:
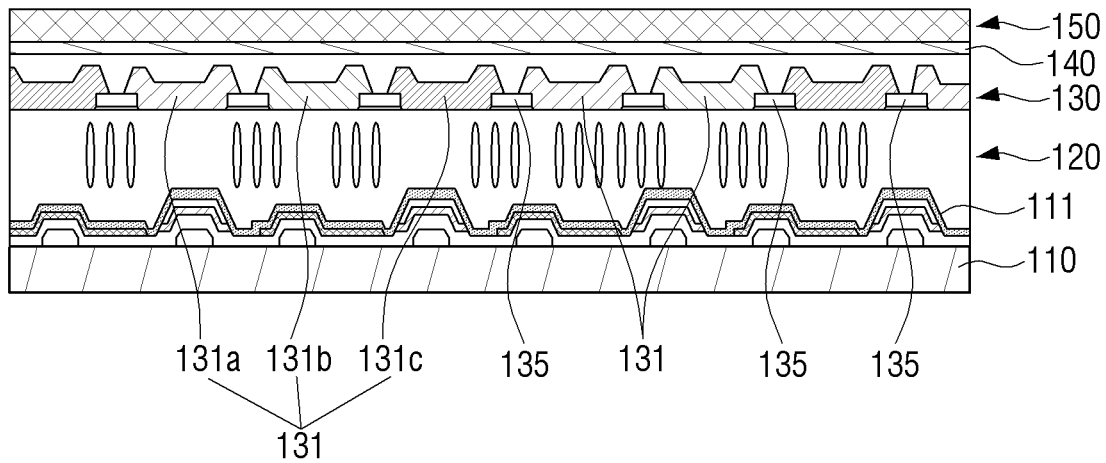
FIG. 2 is a cross-sectional diagram illustrating a display panel according to an embodiment of the disclosure.

FIG. 2 is a cross-sectional diagram illustrating a display panel according to an embodiment of the disclosure.

Referring to FIG. 2, the display panel 100 may include a base substrate 110, a color filter layer 130 opposing the base substrate 110, a liquid crystal layer 120 arranged between the base substrate 110 and the color filter layer 130, and a light-collecting layer 150 arranged in the upper part of the color filters 131.

The base substrate 110 is a substrate which is formed as a matrix form of the thin film transistors 111 that are switching elements. On the base substrate 110, the liquid crystal layer 120 may be arranged.

On the liquid crystal layer 120, the color filters 131 may be arranged. The color filter layer 130 may include the plurality of color filters 131 arranged in a matrix form and black matrices arranged between the plurality of color filters 131.

The plurality of color filters 131 may include a first filter 131a wherein a red color is implemented if light passes, a second filter 131b wherein a green color is implemented, and a third filter 131c wherein a blue color is implemented. The first filter 131a, the second filter 131b, and the third filter 131c may be separated by a predetermined interval and arranged in a matrix form.

Between the first filter 131a, the second filter 131b, and the third filter 131c, the black matrices 135 may be arranged, and define the boundaries between the first filter 131a, the second filter 131b, and the third filter 131c.

The black matrices 135 may divide between the first filter 131a, the second filter 131b, and the third filter 131c, and it may be arranged to be adjacent to the first filter 131a, the second filter 131b, and the third filter 131c. The black matrices 135 may consist of a light shielding material. The black matrices 135 may have a shape corresponding to the surrounding area. The black matrices 135 may prevent a light leakage phenomenon to the color filters 131 wherein light is displayed, and clearly distinguish the boundaries between adjacent color filters 131.

In the color filter layer 231, the first filter 131a, the second filter 131b, and the third filter 131c are repetitively arranged with the black matrices 135 as the boundaries. The color filters 131 may grant colors to light that was irradiated from the backlight 30 and passed through the liquid crystal layer 120.

Light emitted from the liquid crystal layer 120 may be emitted in various directions. Accordingly, light provided to the color filters 131 may be emitted not only toward the first filter 131a, the second filter 131b, and the third filter 131c, but also toward the black matrices 135.

The display panel 100 according to an embodiment of the disclosure may further include the light-collecting layer 150 such that the viewing angle and the luminance of the emitted light are improved.

The light-collecting layer 150 may be arranged in the upper part of the color filters 131. Also, the light-collecting layer 150 may be arranged on the outer side of the display panel 100.

The light-collecting layer 150 may collect light emitted from the display panel 100 in the direction of the upper part, and emit the light.

Hereinafter, the detailed structure of the light-collecting layer 150 will be described.

Figure 3:
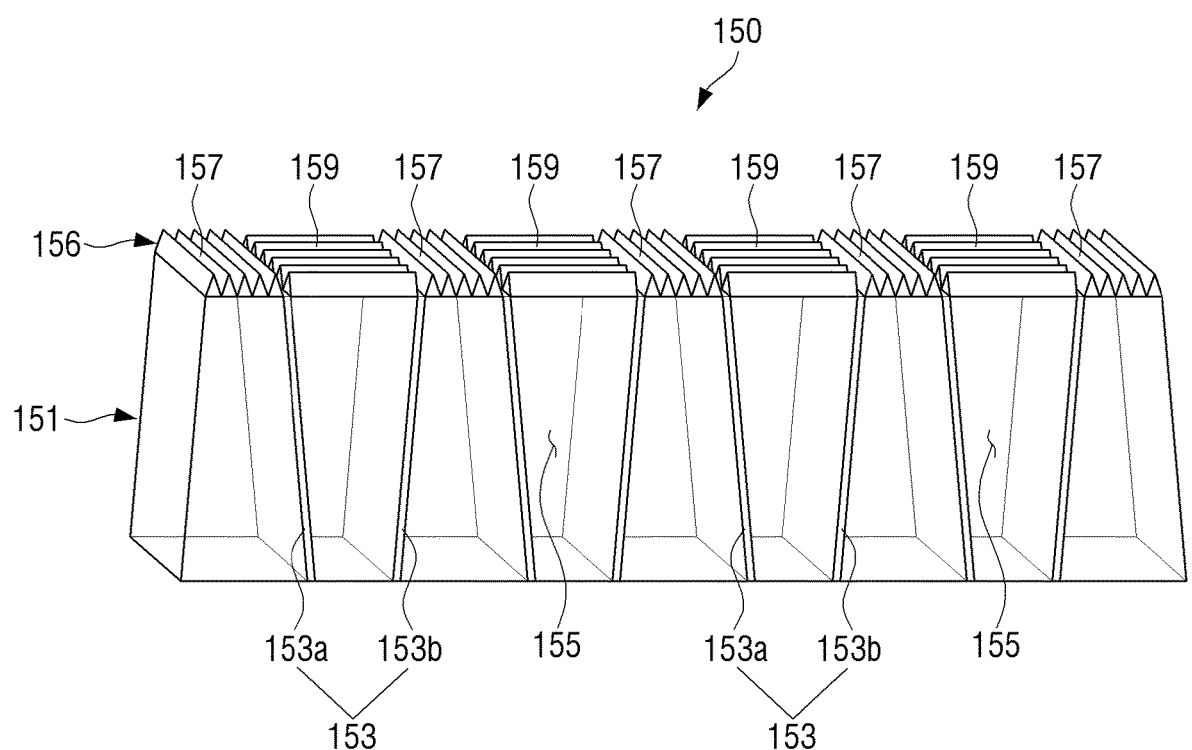
FIG. 3 is a perspective view illustrating a light-collecting layer according to an embodiment of the disclosure.

FIG. 3 is a perspective view illustrating a light-collecting layer according to an embodiment of the disclosure.

Referring to FIG. 3, the light-collecting layer 150 may include a tunnel member 151 and a prism layer 156. Light that passes through the light-collecting layer 150 may be collected firstly by the tunnel member 151, and then collected secondly by the prism layer 156.

The tunnel member 151 may have a plurality of vertical spaces 155 respectively corresponding to the plurality of color filters 131. Each of the plurality of vertical spaces 155 may be formed to correspond to each of the plurality of color filters 131. Accordingly, light that passes through one color filter 131 and expresses a specific color may be emitted to the outside through one corresponding vertical space 155.

The tunnel member 151 may include a plurality of partitions 153 forming the vertical spaces 155. The plurality of partitions 153 may be extensively formed toward the black matrices 135 formed between adjoining color filters 131 among the plurality of color filters 131. The partitions 153 may be formed to entirely surround or partially surround one color filter 131 when viewed on a plane.

Between the first partition 153a and the second partition 153b adjacent to each other among the plurality of partitions 153, a vertical space 155 through which light passes may be defined. Each of the vertical spaces 155 may be formed by the first partition 153a and the second partition 153b.

The first partition 153a may be extensively formed in a first direction, and the second partition 153b may be extensively formed in a second direction intersecting the first direction. The first partition 153a and the second partition 153b may be arranged to be distanced from each other. The first partition 153a and the second partition 153b may be arranged to be distanced from each other such that they have an interval corresponding to one color filter 131 between them.

The first partition 153a and the second partition 153b may be alternately arranged with each other.

The vertical spaces 155 may be formed to correspond to the upper surfaces of each of the plurality of color filters 131. The vertical spaces 155 are formed such that light can pass through them.

As the side surfaces of the vertical spaces 155 are surrounded by the partitions 153, light provided from each of the color filters 131 may be emitted without being mixed with the light provided from the adjacent color filter 131.

The partitions 153 may collect light provided only from the areas corresponding to one color filter 131 among the plurality of color filters 131 and provide the light to the prism layer 156. As only the light provided from one color filter 131 can be emitted by the partitions 153, the purity of colors implemented in the color filter layer 130 can be improved.

The plurality of partitions 153 may contact the upper surfaces of the black matrices 135 of the color filters 131. The partitions 153 may be formed to have a specific thickness, and the thickness of the partitions 153 may be formed as a thickness corresponding to the black matrices 135.

The partitions 153 may consist of a light shielding material. Specifically, the partitions 153 may consist of a black light shielding film. The partitions 153 may have a shape corresponding to the black matrices 135. The partitions 153 may emit only the light provided from one color filter 131, and prevent emission of the light provided from the other color filters.

For collecting the light provided from the color filters 131 and emitting the light, the plurality of partitions 153 may be formed to be tilted with respect to the color filters 131. Light introduced into the tunnel member 151 may be guided to proceed to only one corresponding color filter 131 by the partitions 153.

In addition, in FIG. 3, it is illustrated that the plurality of partitions 153 are arranged to be tilted with respect to the color filters 131, but the disclosure is not limited thereto, and the plurality of partitions 153 may be arranged to be vertical with respect to the color filters 131.

The plurality of partitions 153 may further include a coating layer (not shown). For collecting light that passes through the vertical spaces 155, a coating layer may be formed on the partitions 153. The coating layer may be formed on at least one surface among one surface or the other surfaces of the partitions 153. The coating layer may enhance the light-collecting force of the partitions 153.

The light-collecting layer 150 may further include a prism layer 156 in the upper part of the tunnel member 151 for secondary collecting of light.

The prism layer 156 may be arranged in a location through which light introduced into the tunnel member 151 can pass. Specifically, the prism layer 156 may be formed in the upper surface of the tunnel member 151. The prism layer 156 may improve light-collecting efficiency by collecting light introduced from the tunnel member 151.

On one surface of the prism layer 156, prisms in a shape of a trigonal prism may be formed in a specific arrangement. The prism layer 156 may include a first prism 157 having a first direction and a second prism 159 having a second direction intersecting the first direction.

The first prism 157 may be formed to have the first direction, and the second prism 159 may be formed to have the second direction intersecting the first direction. The second prism 159 has an extended form of a stripe shape, and it may be substantially orthogonal to the first prism 157.

Specifically, the first prism 157 may be a horizontal prism, and the second prism 159 may be a vertical prism.

The first prism 157 which is a horizontal prism may adjust the oriented direction of introduced light right and left. The second prism 159 which is a vertical prism may adjust the oriented direction of introduced light up and down.

The first prism 157 and the second prism 159 may be formed in a shape that is projected from the upper part of the tunnel member 151 to the outer side. The first prism 157 and the second prism 159 may be formed to correspond to the upper surfaces of the vertical spaces 155.

For example, the first prism 157 may be arranged on the upper surface of the first vertical space 155, and the second prism 159 may be formed on the upper surface of the second vertical space 155. The first prism 157 and the second prism 159 may be arranged in a matrix form.

The first prism 157 and the second prism 159 may be alternately arranged.

The first prism 157 and the second prism 159 may be arranged to respectively correspond to the vertical spaces 155. That is, the centers of the first prism 157 and the second prism 159 may be arranged on substantially the same axis as the centers of the respective vertical spaces 155.

Light vertically introduced into the light-collecting layer 150 may be collected by the vertical spaces 155 formed on the tunnel member 151, and the collected light may be collected by the prism layer 156 and emitted.

Light vertically introduced into the vertical space 155 wherein the first prism 157 is arranged may be collected by the partitions 153 of the tunnel member 151, and the collected light may be collected for the second time by the first prism 157, and the oriented direction of the light may be adjusted right and left, and the light may be emitted.

Also, light vertically introduced into the vertical space 155 wherein the second prism 157 is arranged may be collected by the partitions 153 of the tunnel member 151, and the collected light may be collected secondly by the second prism 159, and the oriented direction of the light may be adjusted right and left, and the light may be emitted.

Light introduced into the light-collecting layer 150 may be collected firstly by the tunnel member 151, and then collected secondly by the prism layer 156. The light-collecting layer 150 may improve the optical characteristic of the display device 10 by making the luminance of light output from the display panel 100 uniform and collecting diffused or high luminance light. Also, by the prism layer 156, the display device 10 may widen the viewing angles on the upper side surface, the lower side surface, the left side surface, and the right side surface.

Accordingly, in case the display device 10 is a landscape type of which horizontal length is longer than the vertical length, and which is curved in a horizontal direction, and in case the display device 10 is a portrait type of which horizontal length is shorter than the vertical length, and which is curved in a vertical direction, the luminance and the viewing angle are not reduced, and thus visibility can be improved.

Figure 4:
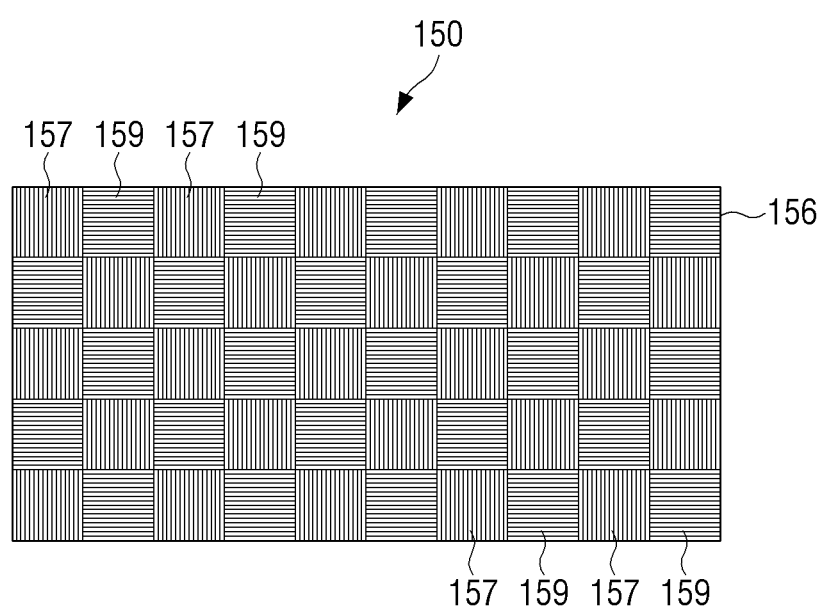
FIG. 4 is a plan view of a light-collecting layer according to an embodiment of the disclosure.

FIG. 4 is a plan view of a light-collecting layer according to an embodiment of the disclosure.

FIG. 4 illustrates the upper surface of the light-collecting layer 150. Specifically, FIG. 4 illustrates the upper surface of the prism layer 156.

Referring to FIG. 4, on the prism layer 156, the first prism 157 and the second prism 159 may be arranged in a matrix form. Also, the first prism 157 and the second prism 159 may be alternately arranged with each other.

The first prism 157 may be formed in the first direction, and the second prism 159 may be formed in the second direction. The first prism 157 which is a horizontal prism may adjust the oriented direction of introduced light right and left. The second prism 159 which is a vertical prism may adjust the oriented direction of introduced light up and down.

By such a prism layer 156, the display device 10 may widen the viewing angles on the upper side surface, the lower side surface, the left side surface, and the right side surface.

Figure 5:
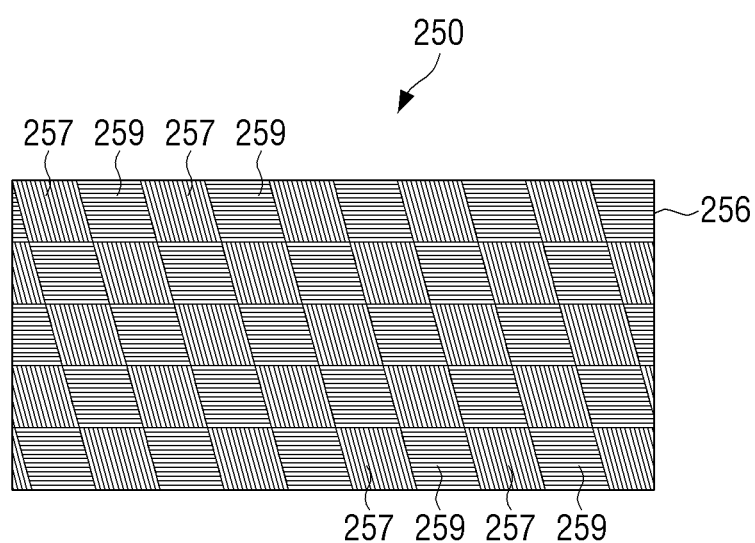
FIG. 5 is a plan view of a light-collecting layer according to another embodiment of the disclosure.

FIG. 5 is a plan view of a light-collecting layer according to another embodiment of the disclosure.

Referring to FIG. 5, most components of the light-collecting layer 250 according to another embodiment of the disclosure are identical to the components of the light-collecting layer 150 described in FIG. 3, but there is a difference in the arrangement structure of the prism layer 256. Accordingly, regarding the components of the light-collecting layer 250 according to another embodiment of the disclosure that overlap with the components of the light-collecting layer 150 described in FIG. 2, detailed explanation will be omitted, and the arrangement structure of the prism layer 256 that has a difference will be mainly explained.

The prism layer 256 may consist of the first prism 257 formed in the first direction, and the second prism 259 formed in the second direction intersecting the first direction.

The first prism 257 may be formed in the first direction that is tilted in a direction tilted to one direction with respect to the side surface of the display panel 100. The second prism 259 may be formed in the second direction tilted to another direction opposing the one direction with respect to the side surface of the display panel 100.

The first prism 257 and the second prism 259 may be formed to be orthogonal to each other.

The first prism 257 which is a horizontal prism may adjust the oriented direction of introduced light to right and left of a diagonal line. The second prism 259 which is a vertical prism may adjust the oriented direction of introduced light to up and down of a diagonal line.

The first prism 257 and the second prism 259 may be arranged to be tilted with respect to an outer frame of the display panel. By such a prism layer 256, the display device 10 may improve visibility in various aspects, and widen the viewing angle.

Figure 6:
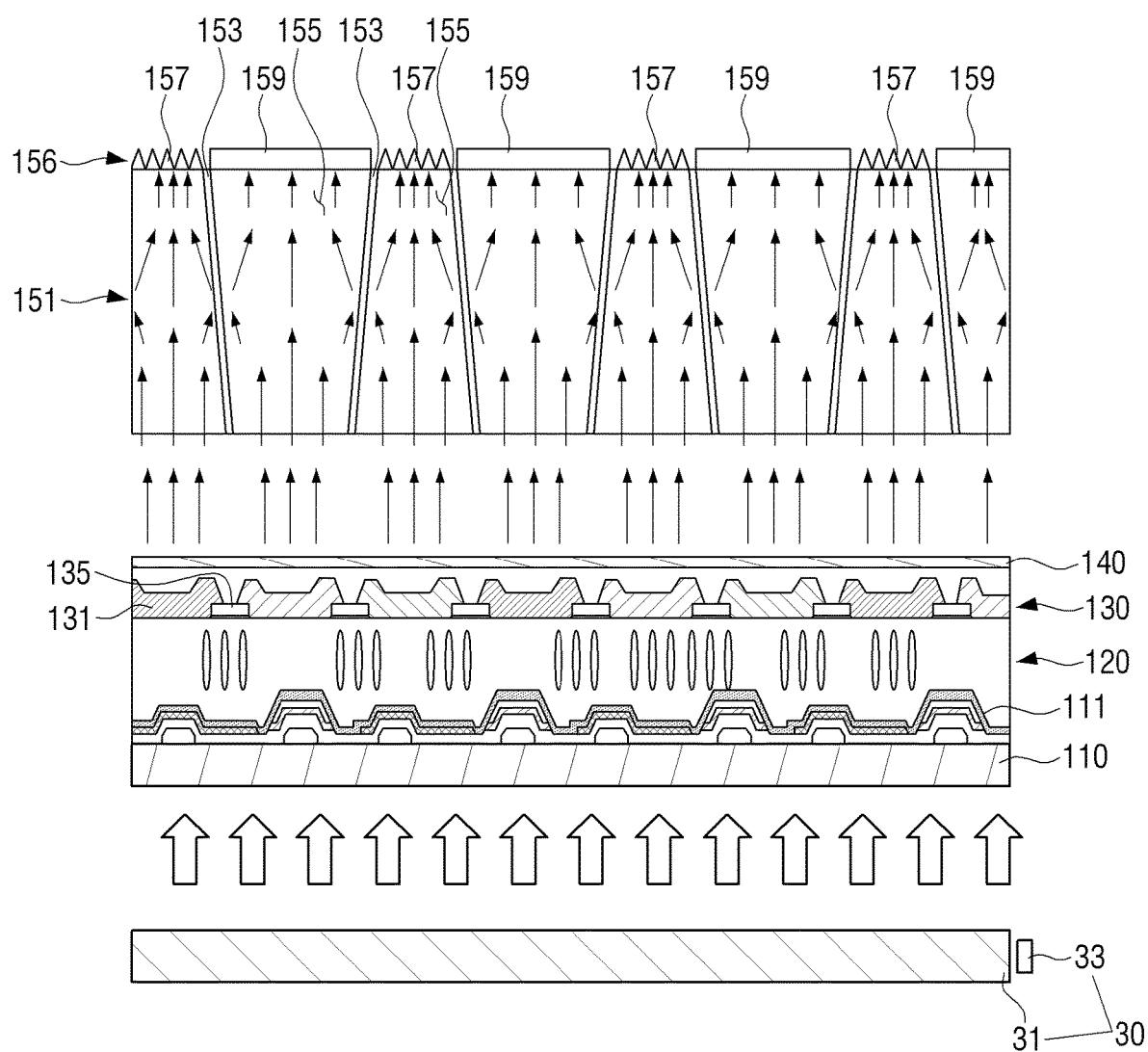
FIG. 6 is a cross-sectional diagram illustrating a path of light in a display panel according to an embodiment of the disclosure.

FIG. 6 is a cross-sectional diagram illustrating a path of light in a display panel according to an embodiment of the disclosure.

Referring to FIG. 6, light provided from the backlight 30 to the display panel 100 is a white light, and is provided to the liquid crystal layer 120.

If power is applied to a gate terminal of a thin film transistor formed in a location corresponding to the second filter 131b of the base substrate 110, and the thin film transistor is turned on, an electronic field may be formed, and the arrangement of the liquid crystals of the liquid crystal layer 120 may be changed by the electronic field, and light may pass through the liquid crystal layer 120.

The light that passed through the liquid crystal layer 120 may pass through the color filters 131 and may be expressed in colors corresponding to each of the color filters 131. The light of which color was expressed is introduced into the tunnel member 151 of the light-collecting layer 150. The light introduced into the tunnel member 151 may proceed in all directions. The light proceeding in all directions is blocked such that the light proceeds only to the vertical spaces 155 corresponding to each color filter 131 by the partitions 153 of the tunnel member 151, and does not proceed toward the vertical spaces 155 corresponding to the other adjacent color filters 131.

As the light of which color was expressed provided from the color filters 131 is not mixed with the adjacent light expressed in a different color by the partitions 153 of the tunnel member 151, a user may recognize only the pure color without recognizing the light of a different color, and thus color purity and color reproducibility can be improved.

The light that passed through the vertical spaces 155 of the tunnel member 151 may be introduced into the prism layer 156. The prism layer 156 may collect the light and thereby improve the efficiency of the light.

The light provided from the backlight 30 may be introduced only into the vertical spaces 155 corresponding to each of the color filters 131 by the partitions 153 of the tunnel member 151. The light introduced into the vertical spaces 155 may pass through the prism layer 156 and collected secondly. Accordingly, the light provided to the display panel 100 may be collected on the light-collecting layer 150, and then emitted.

The light-collecting layer 150 may collect the light secondly, and emit the light provided from each color filter 131 of the color filters 131 on the light-collecting layer 150 to correspond to the color filters 131. Accordingly, the light emitted by the light-collecting layer 150 is not influenced by the light provided from the other color filters 131, and thus high color purity and color reproducibility can be implemented.

Also, as the oriented direction of the light may be adjusted right and left and up and down by the prism layer 156, the display device 10 may improve visibility in the upper side surface, the lower side surface, the left side surface, and the right side surface, and widen the viewing angle.

In the above descriptions, the disclosure was described by an exemplary method. However, the terms used herein are just for explanation, and are not intended to be understood as limiting the disclosure. Also, according to the above descriptions, various amendments and modifications of the disclosure may be made. Accordingly, unless additionally mentioned separately, the disclosure may be freely implemented within the scope of the appended claims.

What is claimed is:

1. A display device comprising:
a display panel comprising a color filter layer consisting of a plurality of color filters arranged in a matrix form and black matrices disposed between the plurality of color filters;
a backlight configured to supply light to the display panel; and
a light-collecting layer disposed in the upper part of the display panel,
wherein the light-collecting layer comprises:
a tunnel member having a plurality of vertical spaces respectively corresponding to the plurality of color filters; and
a prism-layer in which a first prism having a first direction and a second prism having a second direction intersecting the first direction are alternately arranged, and disposed in the upper part of the tunnel member.

2. The display device of claim 1,
wherein each of the first prism and the second prism is disposed in the upper part of one corresponding vertical space among the plurality of vertical spaces.

3. The display device of claim 1,
wherein each of the first prism and the second prism is extensively formed in a stripe shape, and
the second prism is orthogonal to the first prism.

4. The display device of claim 1,
wherein the first prism is a horizontal prism, and
the second prism is a vertical prism.

5. The display device of claim 1,
wherein the first prism is disposed to be in parallel with the side surface of the color filter layer, and
the second prism is disposed vertically to the side surface of the color filter layer.

6. The display device of claim 1,
wherein the first prism is disposed to be tilted by a specific angle with respect to the side surface of the color filter layer.

7. The display device of claim 1,
wherein the vertical spaces are formed to correspond to one color filter among the plurality of color filters.

8. The display device of claim 1,
wherein the tunnel member further comprises a plurality of partitions that are extensively formed between adjacent color filters among the plurality of color filters.

9. The display device of claim 8,
wherein the plurality of partitions form the vertical spaces by partitioning the tunnel member.

10. The display device of claim 8,
wherein the plurality of partitions are disposed to be tilted by a specific angle with respect to the prism layer.

11. The display device of claim 8,
wherein the plurality of partitions comprise:
a first partition tilted toward one side of the tunnel member; and
a second partition tilted toward the other side of the tunnel member, and
wherein the first partition and the second partition are alternately arranged.

12. The display device of claim 8,
wherein the plurality of partitions consist of black light shielding film.

13. The display device of claim 8,
wherein the plurality of partitions comprise a coating layer.

14. The display device of claim 1,
wherein the display panel further comprises a base substrate and a liquid crystal layer disposed in the upper part of the base substrate, and
the color filter layer is disposed in the upper part of the liquid crystal layer.

* * * * *